United States Patent [19]

Patel et al.

[11] Patent Number: 5,422,388
[45] Date of Patent: * Jun. 6, 1995

[54] LOW VOC (VOLATILE ORGANIC COMPOUNDS), SOLVENT-BASED PVC PIPE ADHESIVES WHICH MAINTAIN JOINT ADHESIVE PERFORMANCE

[75] Inventors: Naresh D. Patel, Northridge; Mark W. Brown, Downey, both of Calif.

[73] Assignee: IPS Corporation, Calif.

[*] Notice: The portion of the term of this patent subsequent to Oct. 12, 2010 has been disclaimed.

[21] Appl. No.: 99,834

[22] Filed: Jul. 29, 1993

Related U.S. Application Data

[63] Continuation-in-part of Ser. No. 837,810, Feb. 18, 1992, Pat. No. 5,252,634.

[51] Int. Cl.$^6$ ............ C08K 5/34; C08K 5/15; C08K 5/07; C08L 27/06
[52] U.S. Cl. ............ 524/104; 523/218; 524/113; 524/360; 524/365; 524/567; 524/527
[58] Field of Search ......... 523/218, 219; 524/104, 524/113, 233, 360, 361, 365, 445, 492, 493, 427, 527, 569, 567

[56] References Cited

U.S. PATENT DOCUMENTS

| | | | |
|---|---|---|---|
| T.917,005 | 12/1973 | Knight | 524/113 |
| 3,765,983 | 10/1973 | Putzier | 156/293 |
| 4,067,841 | 1/1978 | Aurichio | 524/113 |
| 4,672,084 | 6/1987 | Dierdorf et al. | 524/113 |
| 4,675,354 | 6/1987 | Sperling | 524/99 |
| 4,687,798 | 8/1987 | King, Sr. | 524/100 |
| 4,910,179 | 3/1990 | Dierdorf et al. | 524/179 |

FOREIGN PATENT DOCUMENTS

| | | | |
|---|---|---|---|
| 0046957 | 3/1982 | European Pat. Off. | 524/567 |
| 370844A | 5/1990 | European Pat. Off. | C08J 5/12 |
| 0043043 | 10/1972 | Japan | 524/567 |
| 49-011931 | 2/1974 | Japan . | |
| 53-088042 | 1/1977 | Japan . | |
| 54-111543 | 2/1978 | Japan . | |
| 59-187067A | 4/1983 | Japan . | |
| 1451152 | 1/1989 | U.S.S.R. | 524/567 |

*Primary Examiner*—Peter A. Szekely
*Attorney, Agent, or Firm*—Benman Collins & Sawyer

[57] ABSTRACT

A PVC adhesive for joining PVC pipes comprises: (a) about 10 to 22 wt % PVC resin and about 2 to 25 wt % acrylic resin, the total of the PVC resin and acrylic resin ranging from about 18 to 35 wt % of said adhesive; (b) a high vapor pressure solvent comprising about 10 to 50 wt % tetrahydrofuran and 0 to about 40 wt % methyl ethyl ketone, with the total high vapor pressure solvent concentration not exceeding a maximum concentration of about 55 wt % of the total adhesive composition; and a low vapor pressure solvent comprising about 10 to 35 wt % cyclohexanone and 0 to about 35 wt % N-methyl pyrrolidone, with the total low vapor pressure solvent concentration at least about 19 wt % of the total adhesive composition. The VOC (volatile organic compound) level of the PVC adhesive composition of the invention is at or below the allowed maximum value of 450 g/l, yet the adhesive meets or exceeds required performance standards, such as lap shear strength.

14 Claims, No Drawings

LOW VOC (VOLATILE ORGANIC COMPOUNDS), SOLVENT-BASED PVC PIPE ADHESIVES WHICH MAINTAIN JOINT ADHESIVE PERFORMANCE

CROSS-REFERENCE TO RELATED APPLICATION

The present application is a continuation-in-part application of application Ser. No. 07/837,810, filed Feb. 18, 1992, now U.S. Pat. No. 5,252,634.

TECHNICAL FIELD

The present invention relates generally to thermoplastic pipe adhesives, and, more particularly, to adhesives used for joining PVC (polyvinyl chloride) pipe. Specifically, the PVC pipe adhesives disclosed and claimed herein are solvent-based, having an environmentally-acceptable VOC (volatile organic compounds) content.

BACKGROUND ART

Solvent-based adhesives, or cements, have been in use for joining thermoplastic pipe for over 30 years. The development of these adhesives is largely responsible for growth of the thermoplastic pipe industry. Several billion pounds of plastic pipe are produced each year in North America. Rapid-setting, solvent-based adhesives weld the pipes together in a timely manner. These rapid-setting adhesives allow for the testing and troubleshooting of piping systems in a matter of hours while maintaining the long-term durability of the pipe itself. These characteristics, rapid set, ease of use, long-term durability along with low-cost, have made the joining of plastic pipe by solvent-based adhesives a practical and economic system.

The solvent-based adhesives work primarily by two means of action. First, the solvent portion of the formulation softens the outer surfaces of the pipe through solvation of the plastic. Subsequently, the adhesive joint 'cures' (hardens) by means of the solvents evaporating to the surrounding atmosphere from the pipe. Secondly, the resin dissolved in the adhesive dries through solvent evaporation and provides continuity between the welded pipe surfaces which aid in preserving the integrity of the entire pipe system.

These adhesives cure rapidly (within a matter of hours), often allowing piping systems to be tested the same day as constructed. However, perhaps the most important benefit of these solvent-based adhesives is the maintenance of the integrity of the pipe itself. The resin is the same as the plastic pipe. This provides a high degree of long-term durability for the piping system, often up to 30 to 40 years of useful life. This is essential for these systems which are built into the structures of homes and buildings, or are buried underground.

Thousands of miles of thermoplastic piping systems are constructed each day throughout the world, primarily by the means previously described. These systems are used in the transfer of potable water for drinking; drain, waste, and vent (DWV) applications in home and industry; turf and agricultural sprinkler systems; jacuzzi, spa and tub connections, etc. These systems are crucial to the maintenance of safe and healthy means of transport of water and other chemicals throughout the world.

Evaporation of solvents from adhesives is a concern to an environmentally-concerned world, along with all other potential sources of air pollution. Typical solids (non-volatile) contents of plastic pipe adhesives are 10 to 20% for PVC. The balance of the formulation is solvent. By definition, the solvents normally used, e.g., tetrahydrofuran (THF), methyl ethyl ketone (MEK), and acetone are considered to be VOCs. That is, they are volatile compounds which contain the element carbon excluding methane, carbon monoxide, carbon dioxide, carbonic acid, metallic carbides and carbonates, ammonium carbonate, and exempt compounds, such as methylene chloride and 1,1,1-trichloroethane. While other solvents, such as cyclohexanone and dimethyl formamide (DMF), may also be used in such adhesives, the amounts of such solvents are typically minor, considerably less than 15 wt % of the total adhesive concentration. Typical VOC values of present commercial PVC solvent adhesives range from 750 to 850 grams/liter (g/l).

Regulations are being created throughout North America regarding allowable VOC levels in adhesive formulations. Federal, state, and local agencies are beginning to adopt strict measures to drastically reduce these levels. The South Coast Air Quality Management District (SCAQMD) in the Los Angeles area has been a leader of the establishment of rules governing VOCs, such as SCAQMD Rule 1168.

SCAQMD Rule 1168 specifies a VOC level for PVC adhesives of 450 g/l or less, as determined by Method 316-A. All PVC adhesives sold after Jan. 1, 1994, are required to meet that maximum allowed level.

Thus, a PVC adhesive for joining PVC pipes having a maximum VOC level of 450 g/l is required. Yet, such adhesive must also meet the required minimum lap shear strength and other performance criteria set forth in ASTM D-2564.

DISCLOSURE OF INVENTION

In accordance with the invention, a PVC adhesive for joining PVC pipes is provided. The PVC adhesive comprises:
  (a) about 10 to 22 wt % PVC resin and about 2 to 25 wt % acrylic resin, the total of the PVC resin and acrylic resin ranging from about 18 to 35 wt % of the adhesive;
  (b) a high vapor pressure solvent comprising about 10 to 50 wt % tetrahydrofuran and 0 to about 40 wt % methyl ethyl ketone, with the total high vapor pressure solvent concentration not exceeding a maximum concentration of about 55 wt % of the total adhesive composition; and
  (c) a low vapor pressure solvent comprising about 10 to 35 wt % cyclohexanone and 0 to about 35 wt % N-methyl pyrrolidone, with the total low vapor pressure solvent concentration at least about 19 wt % of the total adhesive composition.

The VOC level of the PVC adhesive composition of the invention does not exceed the maximum allowed value of 450 g/l. The lap shear strength of the PVC adhesive meets or exceeds the required values at all stages of curing.

BEST MODES FOR CARRYING OUT THE INVENTION

The major portion of solvent emission from solvent-based thermoplastic pipe adhesives occurs during application of the adhesive to the pipe. The sources of these emissions are the primer used to prepare the pipe surface, open containers filled with adhesive, as well as the bead applied to the pipe and fittings themselves, including spillage of adhesive onto the ground during application. Once the pipe and fittings are welded together, the contribution from the adhesive in the joint is minimal. The majority of the solvent remaining in the adhesive bead is absorbed into the substrates.

Current adhesives and primers incorporate the use of highly volatile solvents as major portions of formulations. Typically, THF is a primary component of any PVC pipe adhesive.

THF is highly volatile at 20° C. with a vapor pressure of 143 mm Hg (THF). Co-solvents currently used are acetone (vapor pressure of 185 mm Hg) and methyl ethyl ketone (vapor pressure of 70 mm Hg). Comparatively minor amounts (less than 15 wt %) of cyclohexanone (vapor pressure of 2 mm Hg) and DMF (vapor pressure of 2.6 mm Hg).

Typical PVC formulations have VOC composite partial pressures of between 90 and 160 mm Hg at 20° C. Most formulations fall in the 105 to 125 mm Hg range. These formulations generally contain less than 15 wt % cyclohexanone and typically about 10 wt %.

The most obvious approach to solving the problem of VOCs is to reduce the volatile portion of the formulation by adding either more resin or filler to the adhesive. However, adding more PVC resin to the solution is problematic in that current formulations are near the upper limit of resin content per solvation abilities of the solvents. The extent to which more resin may be added (approximately 1 to 5% PVC) has an insignificant effect on the reduction of VOCs in a formulation. Any additional resin content will result in a 'gel' which is unworkable and incapable of fusing pipe together.

Attempts to add lower molecular weight PVC resin have been found to reduce VOC levels. However, joints made from such adhesives no longer retain the minimum required lap shear strength under ASTM D-2564.

Adding filler to the formulation reduces the concentration of volatiles of a given compound. However, most fillers are significantly higher in density than the base solution and therefore any reduction of volatiles by increase in solids content is negated by the rapidly increasing weight-per-unit volume. Significant volume displacement of volatiles by filler is accomplished only by high mass content which unacceptably compromises the ability of the formulation to perform as an adhesive.

The importance of increasing solids content while maintaining the density of a formulation and lap shear strength of the joint are essential to any solvent-based solution to the VOC problem.

In accordance with the invention, adhesives for sealing PVC pipes are formulated by incorporating acrylic resin along with PVC resin. To date, acrylic resins have not been used in PVC adhesives. Unexpectedly, the use of acrylic resin in combination with PVC resin permits reduction of VOC solvent levels, yet retains the desired lap shear strength of the joint.

The acrylic resins can be compounded into the formulation and used as a polymeric filler. These acrylic resins, such as Rohm & Haas' V series and du Pont's Elvacite 2000 series resins, have a higher degree of solubility in the solvents listed above along with a lower density than the conventional resins. They also have the unique characteristic of acting as an adhesion promoter to thermoplastic pipe. These resins also facilitate taking up volume in a given formulation.

The resin system employed in the practice of the invention comprises a mixture of PVC and acrylic resins. The concentration of PVC resin ranges from about 10 to 22 wt %, while the concentration of acrylic resin ranges from about 2 to 25 wt %. The minimum level of 10% of PVC is dictated by ASTM D-2564; a concentration of PVC beyond the maximum value of about 22 wt % would not be shelf stable. Less than about 2 wt % acrylic does not result in the benefits provided to the adhesive by the presence of this resin in combination with PVC resin, while greater than about 25 wt % is not soluble in the solvent system.

Within the foregoing constraints, the total resin level in the adhesive ranges from about 18 to 35 wt %. Less than about 18 wt % makes it difficult to achieve VOC levels less than the permitted maximum value of 450 g/l, while greater than about 35 wt % is not shelf stable.

Any of the PVC resins commonly employed in PVC adhesives may be used in the practice of the invention. Particularly preferred are those PVC resins characterized by homopolymers as classified by inherent viscosity (IV) in the range of about 0.6 to 0.95. The inherent viscosity of a PVC resin is determined in accordance with ASTM D-1243.

The acrylic resins advantageously employed in the practice of the invention are those homopolymers, copolymers, and terpolymers of methylmethacrylate. When characterized by inherent viscosity, as measured with a solution containing 0.25 g polymer in 50 ml methylene chloride at 20° C. using a No. 50 Cannon-Fenske Viscometer, the useful range in the practice of the invention is 0.1 to 1.25. Alternatively, an acrylic resin having a melt flow rate as determined by ASTM D-1238 in the range of 1.6 to 24 is acceptable. Examples of acrylic resins suitably employed in the practice of the invention include VS 100, available from Rohm & Haas, and Elvacite 2008 and Elvacite 2010, both available from du Pont.

The solvent system employed in the PVC adhesive of the invention comprises at least one high vapor pressure solvent and at least one low vapor pressure solvent. The high vapor pressure solvent comprises tetrahydrofuran (THF) and, optionally, methyl ethyl ketone. The low vapor pressure solvent comprises cyclohexanone and, optionally, N-methyl pyrrolidone (NMP). Cyclohexanone and NMP are alternative true solvents for PVC. These solvents are significantly less volatile than THF. Cyclohexanone has a vapor pressure of 2 mm Hg at 20° C., while NMP has a vapor pressure of <1 mm Hg at 20° C. Adhesives may be compounded using cyclohexanone and, optionally, NMP as a significant solvent of a formulation to substantially reduce the composite vapor pressure.

THF is present in an amount ranging from about 10 to 50 wt %. Less than about 10 wt % does not etch or soften the PVC pipe adequately at freezing and sub-freezing temperatures, while greater than about 50 wt % results in VOC levels in the adhesive of greater than about 450 g/l.

MEK ranges from 0 to about 35 wt %. This solvent is not a true solvent for PVC resin, but is added to improve brushability of the adhesive onto the PVC pipe. Also, MEK helps reduce cost of the adhesive and though not a true solvent for PVC resins, is a true solvent for acrylic resins. Greater than about 35 wt % of MEK tends to increase the VOC level to unacceptable values. The high vapor pressure of MEK of 70 mm Hg is offset by limiting the maximum concentration of this solvent to 35 wt % or less and by the addition of the acrylic resin to the solids.

The total concentration of the high vapor pressure solvent (THF plus, optionally, MEK) is less than about 55 wt % of the total adhesive composition, in order to keep VOC levels below the maximum permitted value.

Cyclohexanone ranges from about 10 to about 35 wt %. Cyclohexanone, like THF, is a true solvent for the resin system. Also, this solvent has a very low vapor pressure. Less than about 10 wt % detracts from brushability for high solids-containing adhesives, while greater than about 35 wt % does not etch or soften the PVC pipe adequately at freezing and sub-freezing temperatures, and also the adhesive does not meet required lap shear values.

NMP ranges from 0 to about 35 wt %. NMP, like cyclohexanone, is a true solvent for the resin system and has a very low vapor pressure. An adhesive with greater than about 35 wt % does not meet required lap shear values.

The total concentration of the low vapor pressure solvent (cyclohexanone plus, optionally, NMP) is at least about 19 wt % of the total adhesive composition, in order to keep VOC levels below the maximum permitted value.

The low vapor pressure solvents, cyclohexanone and NMP, allow the use of conventional PVC resin, together with added acrylic resin, to maintain the integrity of welded joints. Furthermore, the low vapor pressure solvents eliminate the need for primers due to the slow, deep penetration of these solvents into the pipe itself.

The adhesive of the invention may comprise additional solids. Such additional solids that may be present include fillers, thixotropic agents, pigments, and the like. Up to about 5 wt % of the adhesive may contain such additional solids. Thus, the total solids content (resin plus the additional solids) in the adhesive of the invention ranges from about 18 to 40 wt %.

Preferred fillers include low specific gravity hollow ceramic spheres and calcium carbonate. Preferred pigments include titanium dioxide and carbon black.

The thixotropic agents, such as fumed silica (e.g., Cab-o-Sil, Aerosil) and treated bentonite clay (e.g., Bentone 27) may be used at low levels to obtain optimum flow properties, especially with regard to controlling spillage from the pipe upon application.

Low vapor pressure solvents (cyclohexanone and NMP) help accomplish the monumental task of formulating adhesives which volatilize at a substantially reduced rate. Combining these solvents with the more conventional solvents THF and MEK at reduced concentrations significantly lowers the emissions derived from adhesives used in the plastic pipe industry while meeting or exceeding the standards of the industry. Thixotropic agents formulated into these adhesives make a tangible contribution to lowering the emissions through controlling spillage. These changes to current formulations are minimal to the end user from the standpoint of application, testing, economics, and long-term durability and liability.

Within the ranges claimed above, there are two preferred ranges of compositions. The first preferred range is characterized by a lower acrylic concentration, a lower total solids content, and a low VOC composite vapor pressure of between 36 and 80 mm Hg. The second preferred range is characterized by a higher total solids content, which serves to reduce the concentration of the high boiling point solvents.

The first preferred composition range is given by (a) about 12 to 16 wt % PVC resin and about 4 to 8 wt % acrylic resin;
(b) about 12 to 28 wt % tetrahydrofuran and 0 to about 22 wt % methyl ethyl ketone; and
(c) about 15 to 35 wt % cyclohexanone and 0 to about 30 wt % N-methyl pyrrolidone, with the total being at least about 30 wt %.

Preferably, the amount of additional solids, e.g., pigment, filler, thixotropic agents, in the first preferred composition totals about 2 wt %.

The second preferred composition range is given by (a) 10 to 15 wt % PVC resin and about 10 to 20 wt % acrylic resin;
(b) about 25 to 50 wt % tetrahydrofuran and about 20 to 35 wt % methyl ethyl ketone, with the total being no more than about 55 wt %;
(c) about 10 to 22 wt % cyclohexanone and 0 to about 10 wt % N-methyl pyrrolidone, with the total being at least about 19 wt %.

Preferably, the amount of additional solids, e.g., pigment, filler, thixotropic agents, in the second preferred composition ranges up to about 2 wt %.

The adhesives of the invention are made in a batch process. The solvents are charged one at a time to the mixing tank and blended for a short period of time to achieve a state of equilibrium. The resins are then individually charged to the mixer and mixed with high shear dispensers to achieve complete dissolution in the solvent system. At this point, the pigments and fillers (if needed) are added and dispersed to ensure substantially uniform dispersion. The thixotropic agent (if needed) is added last and dispersed to achieve the desired flow characteristics.

The adhesives of the invention are useful in joining PVC pipe in all PVC applications, including, but not limited to, plumbing, drain and waste systems, portable water systems, electrical conduit, agricultural irrigation, turf and landscape sprinkler systems, industrial piping systems, and the like. The adhesives of the invention are applied to the PVC joints in the same way as other commercial PVC adhesives.

The adhesives of the invention maintain the shelf stability associated with presently used PVC adhesives and meets or exceeds performance requirements while exhibiting desirably lower VOC levels. Specifically, the adhesives meet ASTM D-2564 performance standards and they meet VOC regulations such as those published by South Coast Air Quality Management District Rule 1168, and are expected to meet the eventual regulations of Ventura County and San Diego Air Quality Management Districts (both in California), when published.

EXAMPLES

Examples 1–4

The following compositions listed in Table I below exemplify the first preferred compositions (Group I), which are characterized by a lower acrylic concentration, a lower total solids content, and a low VOC composite vapor pressure of between 36 and 80 mm Hg. The additional ("add'l") solids include the total of pigments, fillers, and thixotropic agents. Table I also includes the viscosity of the adhesive (as measured by a Brookfield viscometer) and the composite vapor pressure in mm of Hg.

The lap shear strength (in psi) was measured at three time intervals: 2 hrs, 16 hrs, and 72 hrs. For comparison, the minimum ASTM required value per ASTM D-2564 is 250 psi, 500 psi, and 900 psi, respectively. Further, the VOC level (in g/l) was measured, using Method 316-A, as provided in Rule 1168 of SCAQMD. For comparison, the maximum VOC level permitted is 450 g/l. These results are also shown in Table I.

TABLE I

| Composition and Properties of Adhesives (Group I). | | | | |
| --- | --- | --- | --- | --- |
| Components/Example: | 1 | 2 | 3 | 4 |
| PVC 0.68 IV | 14 | 14 | 14 | 14 |
| Acrylic VS-100 | 6 | 6 | 4 | 6 |
| THF | 26 | 26 | 13 | 15 |
| MEK | 22 | 22 | 20 | — |
| Cyclohexanone | 30 | 15 | 25 | 33 |
| NMP | — | 15 | 22 | 30 |
| Add'l solids | 2 | 2 | 2 | 2 |
| Total | 100 | 100 | 100 | 100 |
| Total solids level | 22 | 22 | 20 | 22 |
| Viscosity (cp) | 1360 | 5200 | 5200 | 2120 |
| Composite vapor pressure, mm Hg | 75.7 | 75.5 | 49 | 36 |
| Lap shear strength | | | | |
| 2 hrs (psi) | 282 | 314 | 336 | 250 |
| 16 hrs (psi) | 641 | 706 | 611 | 620 |
| 72 hrs (psi) | 1094 | 1286 | 1218 | 1148 |
| VOC level (g/l) | 431 | 431 | 408 | 275 |

The compositions of the invention are seen to maintain and in many cases exceed ASTM D-2564 performance requirements and to evidence low VOC levels. Table I demonstrates the combination of comparatively high concentrations of the low vapor pressure solvent system, combined with acrylic resin to achieve the desired properties.

Examples 5-9

The following compositions listed in Table II below exemplify the second preferred compositions (Group II), which are characterized by a higher total solids content, which serves to reduce the concentration of the high boiling point solvents (cyclohexanone and NMP). The additional ("add'l") solids include the total of pigments, fillers, and thixotropic agents. Table II also includes the viscosity of the adhesive (as measured by a Brookfield viscometer) and the composite vapor pressure in mm of Hg.

The lap shear strength (in psi) was measured at three time intervals: 2 hrs, 16 hrs, and 72 hrs. For comparison, the minimum ASTM required value per ASTM D-2564 is 250 psi, 500 psi, and 900 psi, respectively. Further, the VOC level (in g/l) was measured, using Method 316-A, as provided in Rule 1168 of SCAQMD. For comparison, the maximum VOC level permitted is 450 g/l. These results are also shown in Table II.

TABLE II

| Composition and Properties of Adhesives (Group II). | | | | | |
| --- | --- | --- | --- | --- | --- |
| Components/Example: | 5 | 6 | 7 | 8 | 9 |
| PVC 0.68 IV | 14 | 13.5 | 13.5 | 12 | 10 |
| Acrylic VS-100 | 10 | 12.5 | 16.5 | 18 | 20 |
| THF | 30 | 34 | 50 | 26 | 26 |
| MEK | 22 | 20 | — | 22 | 22 |
| Cyclohexanone | 22 | 19 | 20 | 22 | 22 |
| NMP | — | — | — | — | — |
| Add'l solids | 2 | 1 | — | — | — |
| | 100 | 100 | 100 | 100 | 100 |
| Total solids level | 26 | 27 | 30 | 30 | 30 |
| Viscosity (cp) | 2080 | 1400 | 1880 | 1920 | 1280 |
| Composite vapor pressure, mm Hg | 86 | 92.6 | 110 | 82.5 | 82.5 |
| Lap shear strength | | | | | |
| 2 hrs (psi) | 258 | 279 | 260 | 255 | 250 |
| 16 hrs (psi) | 668 | 673 | 647 | 657 | 676 |

TABLE II-continued

| Composition and Properties of Adhesives (Group II). | | | | | |
| --- | --- | --- | --- | --- | --- |
| Components/Example: | 5 | 6 | 7 | 8 | 9 |
| 72 hrs (psi) | 1135 | 1288 | 1322 | 1179 | 1157 |
| VOC level (g/l) | 450 | 418 | 401 | 403 | 376 |

The compositions listed in Table II above illustrate the high level of solids achievable with the acrylic-containing PVC adhesives of the invention. Table II demonstrates the combination of comparatively lower concentrations of the low vapor pressure solvent system, compared to that listed in Table I, combined with higher concentrations of acrylic resin to achieve the desired properties.

The compositions of the invention are seen to maintain and in many cases exceed ASTM D-2564 performance requirements and to evidence low VOC levels.

Comparative Examples 10-14

For comparison, compositions were prepared in which the acrylic content was omitted and in which lower molecular weight PVC resins were employed. The compositions are listed in Table III, below.

The molecular weight of the PVC resin is characterized in terms of its inherent viscosity (IV); the higher the inherent viscosity, the higher the molecular weight. Current PVC adhesives generally use the 0.92 and/or 0.68 IV resins.

The lap shear strength (in psi) was measured at three time intervals: 2 hrs, 16 hrs, and 72 hrs. For comparison, the minimum ASTM required value per ASTM D-2564 is 250 psi, 500 psi, and 900 psi, respectively. Further, the VOC level (in g/l) was measured, using Method 316-A, as provided in Rule 1168 of SCAQMD. For comparison, the maximum VOC level permitted is 450 g/l. These results are also shown in Table III, below.

TABLE III

| Comparative Examples. | | | | | |
| --- | --- | --- | --- | --- | --- |
| Components/Example: | 10 | 11 | 12 | 13 | 14 |
| THF | 85 | 80.5 | 77 | 76 | 73 |
| PVC 0.92 IV | 15 | | | | |
| PVC 0.68 IV | | 19.5 | | | |
| PVC 0.55 IV | | | 23 | | |
| PVC 0.53 IV | | | | 24 | |
| PVC 0.46 IV | | | | | 27 |
| | 100 | 100 | 100 | 100 | 100 |
| total solids level | 15 | 19.5 | 23 | 24 | 27 |
| viscosity (cp) | 500 | 500 | 500 | 500 | 500 |
| Lap shear strength | | | | | |
| 2 hrs (psi) | 341 | 288 | 212 | 204 | 175 |
| 16 hrs (psi) | 713 | 673 | 669 | 537 | 498 |
| 72 hrs (psi) | 1705 | 1391 | 858 | 848 | 776 |
| VOC level (g/l) | 541 | 528 | 505 | 500 | 479 |

As is evident from Table III, decreasing the PVC molecular weight results in adhesives that do not meet ASTM D-2564 performance standards. Further, these adhesives exceed the maximum allowed VOC levels of 450 g/l.

INDUSTRIAL APPLICABILITY

The PVC adhesives of the invention are expected to find use in joining PVC pipes together.

Thus, there has been disclosed a PVC adhesive for bonding PVC articles to PVC articles. It will be readily apparent to those skilled in this art that various changes and modifications of an obvious nature may be made, and all such changes and modifications are considered to fall within the scope of the invention, as defined by the appended claims.

What is claimed is:

1. A polyvinyl chloride (PVC) adhesive for joining PVC pipes consisting essentially of:
   (a) about 10 to 22 wt % PVC resin and about 2 to 25 wt % acrylic resin, the total of said PVC resin and acrylic resin ranging from about 18 to 35 wt % of said adhesive;
   (b) a high vapor pressure solvent consisting essentially of about 10 to 50 wt % tetrahydrofuran and 0 to about 40 wt % methyl ethyl ketone, with the total high vapor pressure solvent concentration not exceeding a maximum concentration of about 55 wt % of said adhesive;
   (c) a low vapor pressure solvent consisting essentially of about 10 to 35 wt % cyclohexanone and 0 to about 35 wt % N-methyl pyrrolidone, with the total low vapor pressure solvent concentration at least about 19 wt % of said adhesive; and
   (d) up to about 5 wt % of at least one component selected from the group consisting of pigments, fillers, and thixotropic agents, said adhesive having a volatile organic compound concentration not exceeding 450 g/l.

2. The PVC adhesive of claim 1 wherein said PVC resin consists essentially of a homopolymer PVC resin having an inherent viscosity in the range of about 0.6 to 0.95.

3. The PVC adhesive of claim 1 wherein said acrylic resin consists essentially of a homopolymer, copolymer, or terpolymer of methylmethacrylate having either an inherent viscosity ranging from about 0.1 to 1.25 or a melt flow rate ranging from about 1.6 to 24.

4. The PVC adhesive of claim 1 wherein said thixotropic agent is selected from the group consisting of fumed silica and treated bentonite clay.

5. The PVC adhesive of claim 1 wherein said filler is selected from the group consisting of low specific gravity hollow ceramic spheres and calcium carbonate.

6. The PVC adhesive of claim 1 consisting essentially of:
   (a) about 12 to 16 wt % PVC resin and about 4 to 8 wt % acrylic resin;
   (b) about 12 to 28 wt % tetrahydrofuran and 0 to about 22 wt % methyl ethyl ketone;
   (c) about 15 to about 35 wt % cyclohexanone and 0 to about 30 wt % N-methyl pyrrolidone; and
   (d) about 2 wt % additional solids selected from the group consisting of pigments, fillers, and thixotropic agents.

7. The PVC adhesive of claim 1 consisting essentially of
   (a) about 10 to 15 wt % PVC resin and about 10 to 20 wt % acrylic resin;
   (b) about 25 to 50 wt % tetrahydrofuran and 20 to about 35 wt % methyl ethyl ketone;
   (c) 10 to about 22 wt % cyclohexanone and 0 to about 10 wt % N-methyl pyrrolidone; and
   (d) 0 to about 2 wt % additional solids selected from the group consisting of pigments, fillers, and thixotropic agents.

8. A method for reducing volatile organic compound emissions from polyvinyl chloride (PVC) pipe adhesives, wherein said adhesive is formulated by combining
   (a) a resin component consisting essentially of about 10 to 22 wt % PVC resin and about 2 to 25 wt % acrylic resin, the total of said PVC resin and acrylic resin ranging from about 18 to 35 wt % of said adhesive;
   (b) a high vapor pressure solvent consisting essentially of about 10 to 50 wt % tetrahydrofuran and 0 to about 40 wt % methyl ethyl ketone, with the total high vapor pressure solvent concentration not exceeding a maximum concentration of about 55 wt % of said adhesive;
   (c) a low vapor pressure solvent consisting essentially of about 10 to 35 wt % cyclohexanone and 0 to about 35 wt % N-methyl pyrrolidone, with the total low vapor pressure solvent concentration at least about 19 wt % of said adhesive; and
   (d) up to about 5 wt % of at least one component selected from the group consisting of pigments, fillers, and thixotropic agents, said adhesive having a volatile organic compound concentration not exceeding 450 g/l.

9. The method of claim 8 wherein said PVC resin consists essentially of a homopolymer PVC resin having an inherent viscosity in the range of about 0.6 to 0.95.

10. The method of claim 8 wherein said acrylic resin consists essentially of a homopolymer, copolymer, or terpolymer of methylmethacrylate having either an inherent viscosity ranging from about 0.1 to 1.25 or a melt flow rate ranging from about 1.6 to 24.

11. The method of claim 8 wherein said thixotropic agent is selected from the group consisting of fumed silica and treated bentonite clay.

12. The method of claim 8 wherein said filler is selected from the group consisting of low specific gravity hollow ceramic spheres and calcium carbonate.

13. The method of claim 8 wherein said adhesive is formulated by combining
   (a) about 12 to 16 wt % PVC resin and about 4 to 8 wt % acrylic resin;
   (b) about 12 to 28 wt % tetrahydrofuran and 0 to about 22 wt % methyl ethyl ketone;
   (c) about 15 to about 35 wt % cyclohexanone and 0 to about 30 wt % N-methyl pyrrolidone; and
   (d) about 2 wt % additional solids selected from the group consisting of pigments, fillers, and thixotropic agents.

14. The method of claim 8 wherein said adhesive is formulated by combining
   (a) about 10 to 15 wt % PVC resin and about 10 to 20 wt % acrylic resin;
   (b) about 25 to 50 wt % tetrahydrofuran and 20 to about 35 wt % methyl ethyl ketone;
   (c) 10 to about 22 wt % cyclohexanone and 0 to about 10 wt % N-methyl pyrrolidone;
   (d) 0 to about 2 wt % additional solids selected from the group consisting of pigments, fillers, and thixotropic agents.

* * * * *